US012137405B2

(12) United States Patent
Chen (10) Patent No.: US 12,137,405 B2
(45) Date of Patent: Nov. 5, 2024

(54) NETWORK ARCHITECTURE ENABLING A MOBILE TERMINAL TO ROAM INTO A WIRELESS LOCAL AREA NETWORK

(71) Applicant: Orange, Issy-les-Moulineaux (FR)

(72) Inventor: Xiaobao Chen, Bath (GB)

(73) Assignee: ORANGE, Issy-les-Moulineaux (FR)

( * ) Notice: Subject to any disclaimer, the term of this patent is extended or adjusted under 35 U.S.C. 154(b) by 0 days.

(21) Appl. No.: 14/904,334

(22) PCT Filed: Jul. 9, 2014

(86) PCT No.: PCT/EP2014/064709
§ 371 (c)(1),
(2) Date: Jan. 11, 2016

(87) PCT Pub. No.: WO2015/004180
PCT Pub. Date: Jan. 15, 2015

(65) Prior Publication Data
US 2016/0135116 A1    May 12, 2016

(30) Foreign Application Priority Data
Jul. 9, 2013   (EP) .................................... 13305973

(51) Int. Cl.
*H04W 48/14*    (2009.01)
*H04W 48/20*    (2009.01)
*H04W 84/12*    (2009.01)

(52) U.S. Cl.
CPC ........... *H04W 48/14* (2013.01); *H04W 48/20* (2013.01); *H04W 84/12* (2013.01)

(58) Field of Classification Search
CPC ...... H04W 48/14; H04W 48/20; H04W 84/12
(Continued)

(56) References Cited

U.S. PATENT DOCUMENTS

2004/0133806 A1*  7/2004  Joong .................. H04W 84/00
                                                713/150
2006/0153135 A1*  7/2006  Ascolese ............ H04L 12/5692
                                                370/331
(Continued)

FOREIGN PATENT DOCUMENTS

EP         1643684 A1     4/2006
WO    WO-2006027564 A1 *  3/2006  ............. H04L 63/08

OTHER PUBLICATIONS

International Search Report and Written Opinion dated Jan. 12, 2015 for corresponding International Application No. PCT/EP2014/064709, filed Jul. 9, 2014.
(Continued)

*Primary Examiner* — Charles N Appiah
*Assistant Examiner* — Nicole M Louis-Fils
(74) *Attorney, Agent, or Firm* — David D. Brush; Westman, Champlin & Koehler, P.A.

(57) ABSTRACT

A method is provided for granting access, for user equipment registered in a home mobile network to a wireless local area network. In this method, a probe request is received by an access network server located in the wireless local area network, wherein this probe request includes first information allowing to identify the home mobile network of the user equipment. The access network server determines then at least one access point of the wireless local area network to which the user equipment is allowed to connect, based on the identification of the home mobile network from the first information and sends a response message including at least one access identifier identifying the at least one access point of the wireless local area network.

16 Claims, 4 Drawing Sheets

(58) Field of Classification Search
USPC .......................................................... 455/450
See application file for complete search history.

(56) References Cited

U.S. PATENT DOCUMENTS

| | | | | |
|---|---|---|---|---|
| 2006/0209768 A1* | 9/2006 | Yan | ....................... | H04W 72/04 |
| | | | | 370/338 |
| 2006/0212700 A1* | 9/2006 | Zhang | ................. | H04W 12/084 |
| | | | | 713/167 |
| 2008/0101291 A1* | 5/2008 | Jiang | ..................... | H04L 63/102 |
| | | | | 370/331 |
| 2008/0259881 A1* | 10/2008 | Hancock | ................. | H04L 63/08 |
| | | | | 370/338 |
| 2009/0196265 A1* | 8/2009 | Mariblanca Nieves | ..................... | |
| | | | | H04W 8/065 |
| | | | | 370/338 |
| 2011/0217978 A1* | 9/2011 | Horn | ..................... | H04W 8/186 |
| | | | | 455/433 |
| 2012/0044914 A1* | 2/2012 | Chen | ..................... | H04W 12/08 |
| | | | | 370/338 |
| 2013/0333016 A1* | 12/2013 | Coughlin | .............. | H04W 12/06 |
| | | | | 726/9 |
| 2014/0071967 A1* | 3/2014 | Velasco | ............... | H04L 12/1403 |
| | | | | 370/338 |
| 2014/0199968 A1* | 7/2014 | Canpolat | .......... | H04W 52/0229 |
| | | | | 455/434 |
| 2014/0233544 A1* | 8/2014 | McCann | ................ | H04W 48/16 |
| | | | | 370/338 |
| 2015/0139186 A1* | 5/2015 | Kim | ...................... | H04W 48/14 |
| | | | | 370/331 |
| 2015/0305070 A1* | 10/2015 | Ahmad | ................. | H04W 76/10 |
| | | | | 370/338 |
| 2016/0142955 A1* | 5/2016 | Hedberg | .......... | H04W 36/0061 |
| | | | | 370/331 |
| 2016/0374013 A1* | 12/2016 | Drevon | ................. | H04W 24/02 |
| 2020/0178325 A1* | 6/2020 | Horn | ..................... | H04W 48/08 |

OTHER PUBLICATIONS

Written Opinion dated Jan. 12, 2015 for corresponding International Application No. PCT/EP2014/064709, filed Jul. 9, 2014.
Technical Specification 3GPP TS 23.402 V12.1.0 (Jun. 2013) 3rd Generation Partnership Project; Technical Specification Group Services and System Aspects; Architecture Enhancements for Non-3GPP Accesses (Release 12).

\* cited by examiner

NETWORK ARCHITECTURE ENABLING A MOBILE TERMINAL TO ROAM INTO A WIRELESS LOCAL AREA NETWORK

CROSS-REFERENCE TO RELATED APPLICATIONS

This Application is a Section 371 National Stage Application of International Application No. PCT/EP2014/064709, filed Jul. 9, 2014, which is incorporated by reference in its entirety and published as WO 2015/004180 A2 on Jan. 15, 2015, in English.

FIELD OF THE INVENTION

The present invention relates to the field of wireless telecommunications, and in particular to the connection of mobile users to wireless local access networks.

BACKGROUND OF THE INVENTION

The interworking of a WLAN (i.e. a "Wireless Local Access Network") with a mobile network, particularly a so-called "3GPP network" (i.e. a mobile network as defined in 3GPP standards), has been defined in various standardisation documents. When considering a WLAN defined as a 3GPP IP access network, document TS 23.234 defines the interworking aspects with other 3GPP networks whereas document TS 23.327 defines the mobility aspects.

The need for supporting roaming between a 3GPP network and a non-3GPP network (e.g. a WiFi network provided by non-3GPP network operators or service providers) is recognised for improving the coverage and capacity of 3GPP networks in situations of 3GPP radio access network overload or lack of 3GPP network coverage. Such a need is coupled with the ever increasing accessibility of private and public WiFi networks run by non-3GPP network operators for indoor and public areas, as well as the built-in WiFi accesses in almost all smartphones and portables devices such as tablets and laptops.

To illustrate such a need, an exemplary use case is to enable a 3GPP mobile device in national or international roaming to connect seamlessly to a WiFi network provided by a non-3GPP network operator, by using its subscription profile including the necessary access credentials managed by its home 3GPP network, without the explicit manual configuration which has to be done today for connecting to a WiFi network, for the first connection at least.

The existing standards technology (as described in TS 23.402) supports such a roaming with non-3GPP access networks interworked with a 3GPP network. In other words, the roaming access to a non-3GPP network is only supported, in the existing 3GPP standards, via a 3GPP PLMN ("Public Land Mobile Network") with which the non-3GPP network has an interworking anchored in the 3GPP network(s).

Figure 1A:
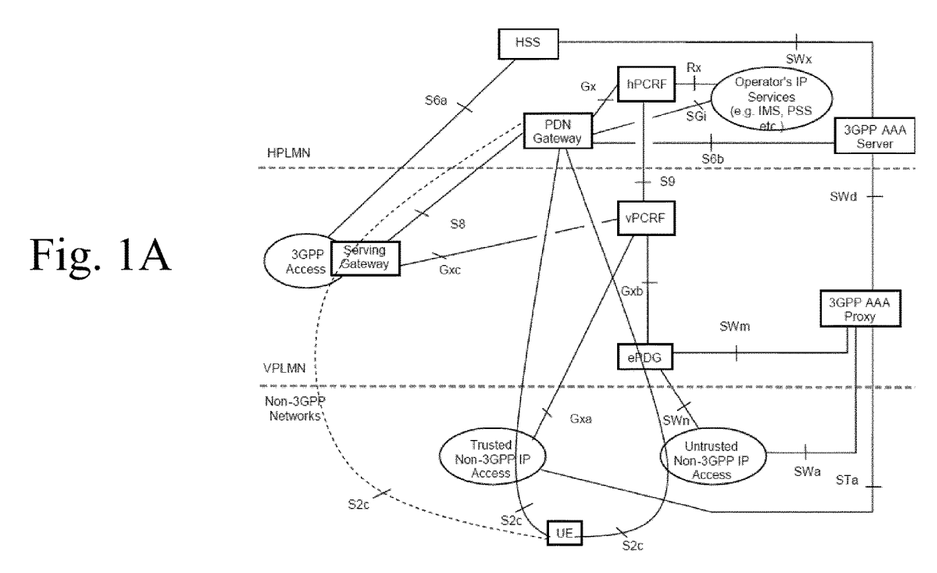
FIGS. 1A and 1B illustrate two roaming scenarios as defined in document TS 23.402.
Figure 1B:
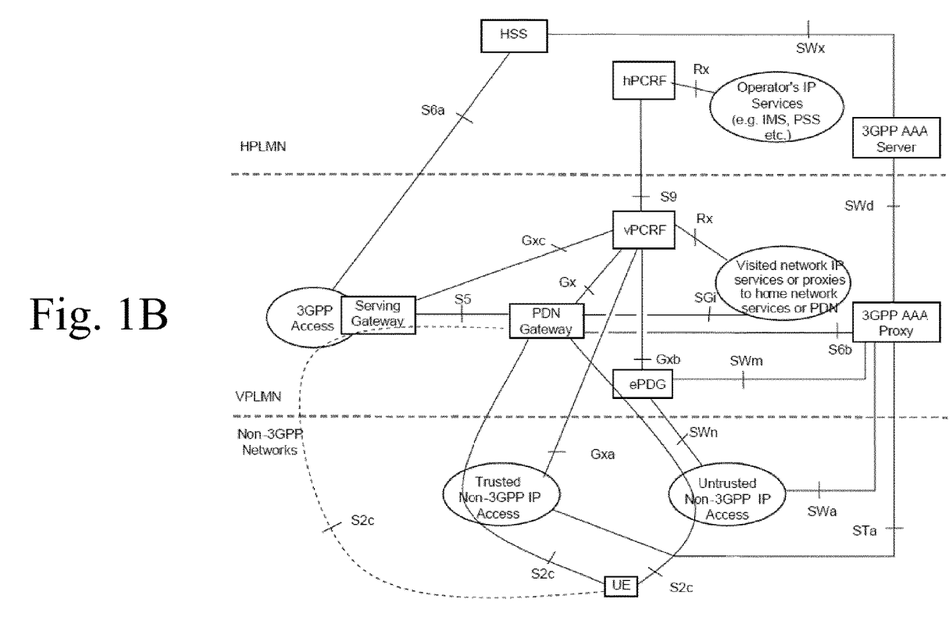

FIGS. 1A and 1B illustrate two roaming scenarios as defined in document TS 23.402.

In particular, FIG. 1A illustrates the roaming architecture in a "home routed" scenario as defined in FIG. 4.2.3-3 of TS 23.402. In such a roaming architecture, the non-3GPP network interworks necessarily with either a visited 3GPP network (via an ePDG gateway) when it provides an untrusted non-3GPP IP access to the user terminal or with the home 3GPP network of this user terminal (via a PDN gateway) when it provides a trusted non-3GPP IP access to this user terminal.

On the other hand, FIG. 1B illustrates the roaming architecture in a "local breakout" scenario as defined in FIG. 4.2.3-5 of TS 23.402. In this other roaming architecture, the non-3GPP network also interworks necessarily with a visited 3GPP network, either via an ePDG gateway when it provides an untrusted non-3GPP IP access to the user terminal or via a PDN gateway when it provides a trusted non-3GPP IP access to this user terminal.

In other words, in all existing roaming scenarios in the current 3GPP standards, the user terminal can only connect to non-3GPP accesses which are anchored (or "interworking") with the roaming partner's 3GPP networks (i.e. anchored on either a PDN gateway and/or a ePDG gateway).

While such scenarios are applicable to use cases where the user terminal wishes to access services offered by its home PLMN (HPLMN in FIGS. 1A and 1B), to access home routed traffic or to access services offered locally by the visited PLMN (VPLMN in FIGS. 1A and 1B), there are scenarios where there is no direct interworking between a 3GPP network and a non-3GPP network.

Besides, there are situations where the user terminal wishes to connect to an access point of a non-3GPP network which has no business relationship with the 3GPP home network of the user terminal, for instance when a 3GPP user terminal roams into areas where there is little or no coverage of a PLMN network, but a good coverage of a WiFi network operated by a non-3GPP service provider.

Consequently, there is strong need for providing mobile users with a direct access to wireless local area networks (for instance to allow them to access internet with a higher bandwidth or better coverage) without either going through the PDN gateway of a home PLMN of a mobile network, or the PDN/ePDG gateway of a visited PLMN of a mobile network.

SUMMARY OF THE INVENTION

It is thus an object of the present invention to overcome the above-identified disadvantages.

According to a first aspect of the present invention, there is provided a method for granting access, for a user equipment registered in a home mobile network, to a wireless local area network, comprising the following steps, performed by an access network server located in the wireless local area network:

receiving a probe request comprising a first information allowing to identify the home mobile network of the user equipment;

determining at least one access point of the wireless local area network to which said user equipment is allowed to connect, based on the identification of said home mobile network from said first information; and sending a response message comprising at least one access identifier identifying said at least one access point of the wireless local area network.

With such an access method, it is possible for a user equipment to be granted access to a wireless local area network which has no interworking anchored in a mobile network. It is therefore possible to tackle the issue of access authorization to wireless local area networks in situations which are not addressed currently in the standards.

In an embodiment of the present invention, the probe request is transmitted from the user equipment through an access point of the wireless local area network and the response message is transmitted to the user equipment through this access point. This allows the user equipment to request a connection to the wireless local area network once under the coverage of this wireless local area network.

In an embodiment of the present invention, the method further comprises transmitting an access network request comprising said first information to a first access network discovery and server function entity located in the home mobile network of the user equipment; and receiving in response, from said access network discovery and server function entity, an access network response comprising a network selection rule; wherein said at least one access point is determined by the access network server using said network selection rule.

With such an embodiment, a mobile network can keep a certain amount of control on the extent to which one of its registered user equipment can access other wireless local area networks which are not interworking anchored with this mobile network, for instance by forbidding certain wireless local area networks or prioritizing some wireless local area networks over others.

In an embodiment of the present invention wherein the wireless local area network is connected to a visited mobile network interworking with the home mobile network of the user equipment, the access network request is received by a second access network discovery and server function entity located in the visited mobile network before being forwarded to the first access network discovery and server function entity.

This embodiment allows a mobile network to keep a certain amount of control on the extent to which one of its registered user equipment can access other wireless local area networks which are not interworking anchored with this home network, but are connected to another mobile network which interworks with this mobile network.

In another embodiment of the present invention, the probe request is transmitted by an access network discovery server and function entity located in the home mobile network of the user equipment and the response message is transmitted to said access network discovery server and function entity. This allows the user equipment to request a connection to a wireless local area network while still under the coverage of its home mobile network.

According to a specific feature, the first information is an identifier of the home mobile network, in order to simplify the access authorization decision taken by the access network server of the wireless local area network. According to another specific feature wherein the first information is an identifier of the user equipment, the method further comprises retrieving an identifier of the home mobile network based on said identifier of the user equipment. This avoids the user equipment to reveal the identity of its home network when probing unknown wireless local area networks.

According to a second object of the present invention, there is provided a device for granting access, for a user equipment registered in a home mobile network, to a wireless local area network, comprising:
- a receiving unit able to receive a probe request comprising a first information allowing to identify the home mobile network of the user equipment;
- a control unit configured to determine at least one access point of the wireless local area network to which said user equipment is allowed to connect, based on an identification of said home mobile network from said first information; and
- a transmitting unit configured to send a response message comprising at least one identifier identifying said at least one access point of the wireless local area network.

In an embodiment of this device, the transmitting unit is further configured to send a policy request to an access network discovery server located within the home mobile network of the user equipment, the receiving unit is further configured to receive, from said access network discovery server, a policy response message comprising a network selection rule, and the control unit is further configured to determine said least one access point of the wireless local area network in accordance with said network selection rule.

According to a third object of the present invention, there is provided a user equipment comprising:
- a transmitting unit configured to send a probe request, comprising a first information allowing to identify the home mobile network of said user equipment, to an access network server of a wireless local area network;
- a receiving unit configured to receive, from said access network server, a response message comprising at least one access identifier identifying at least one access point of the wireless local area network; and
- a processing unit configured to connect the user equipment with said wireless local area network using said at least one access identifier.

According to a fourth object of the invention, there is provided a network system comprising a user equipment as previously described and a device for granting the user equipment an access to a wireless local area network as previously described.

According to a fifth object of the present invention, there is provided a computer program comprising code instructions for performing the steps of the method for granting access to a wireless local area network as described above, when this computer program executed on a processor. There is also provided a recording medium on which is stored such a computer program.

BRIEF DESCRIPTION OF THE DRAWINGS

Other features and advantages of the invention will become apparent from the following description of non-limiting exemplary embodiments, with reference to the appended drawings, in which.

DETAILED DESCRIPTION OF EMBODIMENTS OF THE INVENTION

Next some embodiments of the present invention are described in more detail with reference to the attached figures.

Figure 2:
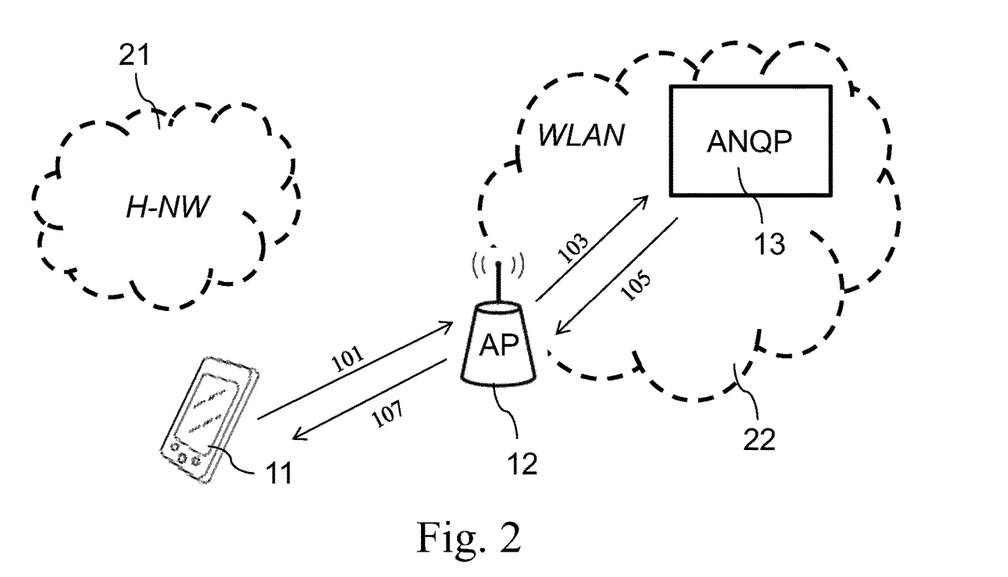
FIG. 2 illustrates a first embodiment of a network architecture in accordance with the present invention.

We refer now to FIG. 2 which illustrates a first embodiment of a network architecture in accordance with the present invention.

In this embodiment, the network architecture comprises a mobile network 21 which is the home mobile network of user equipment 11 (typically a mobile terminal such as a smartphone, a tablet or any mobile device having a mobile network radio interface and a wireless local area network radio interface), that is to say the mobile network wherein the user equipment 11 is registered (typically wherein the user of this user equipment 11 has subscribed). Such a mobile network 21 is typically a 3GPP mobile network, i.e. a mobile network working according to 3GPP standards such as a 3G or 4G mobile network.

The network architecture further comprises a wireless local area network 22, also called WLAN network, which is typically a WiFi network using transmission techniques and protocols as defined in IEEE 802.11x standards. Such a WLAN network can be an indoor local area network, comprising one or several access points located within a building, or an outdoor local area network, comprising several access points also called "hotspots" covering a certain area in a city.

This WLAN network 22 comprises one or more access points 12 (only one is illustrated here, for the sake of simplicity) connected to an access network server 13, which controls the access of mobile terminals to the access points of WLAN network 22.

The access network server 13 may be typically implemented as a server using the ANQP protocol (for "Access Network Query Protocol") as defined in the Technical Specification "Hotspot 2.0 (Release 2), version 1.03" published by the WiFi Alliance (WFA) Technical Committee. Such an ANQP protocol allows a mobile terminal to discover the WLAN access points and query different types of information regarding these access points such as their identifiers, their capacities or their WAN metrics.

In this first embodiment, the access granting process to the WLAN network 22 is performed as follows:

When the user terminal 11 enters into the coverage of an access point 12 of WLAN network 22, it becomes aware of it since it receives a beacon signal emitted by this access point. Following the detection of such a beacon signal, the user terminal 11 can send a probe request (typically an ANQP probe request within a radio signal format) towards this access point 12 (step 101), such a probe request being forwarded by access point 12 to the access network server 13 within WLAN network 22 (step 103). Depending on the network connectivity between the access point 12 and the access network server 13, the probe request may be kept as a radio signal or converted by the access point 12 in another signal format compatible with this network connectivity as well as with the protocol message format used between the user equipment 11 and the access network server 13.

This probe request comprises a first information which allows identifying the home mobile network 21 of the user equipment 11, advantageously in a manner that identifies uniquely the home mobile network of the user equipment with a secure access authorization process.

In an embodiment, this first information is an identifier of this home mobile network 21, for instance its PLMN identifier (i.e. the MCC Mobile Country Code+MNC Mobile Network Code). In such a case, the access network server 13 can directly identify the home mobile network from this information.

In another embodiment, this first information is the IMEI number of the subscriber using the user equipment 11. With such an IMEI number, the access network server 13 can indirectly identify the home mobile network 21, by retrieving its identity from a remote database wherein are stored IMEI numbers mapped with identifiers of their mobile networks. In an embodiment, this mapping may be resolved by an access network and discovery server function entity located in the home mobile network 21, after it has received this IMEI number transmitted by access network server 13. In another embodiment, this mapping is resolved by a HSS server within home mobile network 21 after it has received this IMEI number from an Access and Authorisation server (e.g. AAA server) located in the WLAN network 22.

Thus, once the access network server 13 has received this probe request, it determines the identity of the home mobile network 21 of user equipment 11 based on the first information, as previously explained, and determines if an access can be granted to user equipments registered with this mobile network 21, or not. Such a decision can be made for instance based on the existence of a business relationship between WLAN network 22 and mobile network 21. Alternatively, WLAN network can automatically grant access to mobile users registered with any mobile networks except the ones listed in a black list.

In a specific embodiment, the probe request comprises also a list of WLAN networks identifiers (so-called "preferred WiFi networks"), stored beforehand in the user equipment 11 itself or in a SIM/USIM card located within this user equipment, indicating a list of WLAN networks to which the user equipment 11 is allowed to connect by its home mobile network 21. In other terms, the operator of mobile network 21 may restrict the WLAN networks to which its users may automatically connect with the present process, and impose the memorization of such a restricted list within user equipment 11 and the insertion of this restricted list within the probe request sent by user equipment 11. In such a case, the access network server 13 also checks, besides its own requirements, that its WLAN network 21 belongs to this list of network (e.g. by checking that its own WLAN identifier belongs to the list of WLAN identifiers in the probe request) and grant an access to the user equipment 11 only when this is the case.

On the one hand, if the access network server 13 determines that user equipment 11 should not be granted an access to the WLAN network 22, the access network server 11 can deny access either explicitly, by sending a negative response message to the user equipment 11 via access point 12, or implicitly, by not responding at all to the probe request. In this last case, user equipment 11 derives such an access denial when it has not received any response at all after the expiration of a determined time period or after a number of repeated transmission of the probe requests from to ANQP server.

On the other hand, if the access network server 13 determines that user equipment 11 can be granted an access to the WLAN network 22, then it sends a response message back to the access point 12 (step 105), which then forwards it to the user equipment 11 (step 107). When forwarding the response message, the access point 12 may adapt this response message to a signal format which is compatible with the transmission of such a response from the ANQP server to the user equipment, depending on the used standardised protocol or interface.

This response message comprises one or more access identifier(s) identifying one or more access point(s) of WLAN network 22 to which the user equipment 11 is allowed to connect. In an embodiment, one access identifier such as a SSID identifier can be sent for each access point of the WLAN network 22, these SSID identifiers being listed in a priority order based on the WLAN network service provider's preferences. In another embodiment, a common access identifier, such as a NAI realm identifier, can be sent in order to identify a plurality of access points covering a realm area. Alternatively, an identifier representing a WiFi network included in a probe response as defined by WFA technical specifications can be used.

In a specific embodiment, this response message may also comprise additional information regarding each of the access points which are identified in this response message, such as:
  the capacity of the access point to provide internet access;
  a maximum bandwidth that can be reserved by the access point for the data traffic exchanged with user equipment 11;
  WAN metrics information regarding the data link between the access point and the user equipment 11 (such as downlink speed, uplink speed, downlink percentage loading, uplink percentage loading, load measurement duration)

Once it has obtained such access identifier(s), the user equipment 11 can then establish a connection with an access point of the WLAN network 22 (for instance with the same access point 12 through which it managed to get the access identifier(s), or with another access point if it moved within the WLAN network coverage in the meantime) that belongs to the same WiFi network(s) as represented by the WiFi network identifier(s), in order to access internet or other types of network local services provided by the WLAN network 22. When additional information as previously described has been sent with the access identifiers, the user equipment 11 can use such an additional information when deciding which access point to connect with.

This first embodiment is therefore particularly applicable to cases where the user equipment 11 is within the coverage of a WLAN network which has no interworking relationship with the home mobile network of user equipment 11 (for instance when a user wishes to access the WiFi network of an hotel that has no interworking or roaming with his own mobile network), independently of whether the user equipment 11 is within coverage of its own home mobile network.

Figure 3:
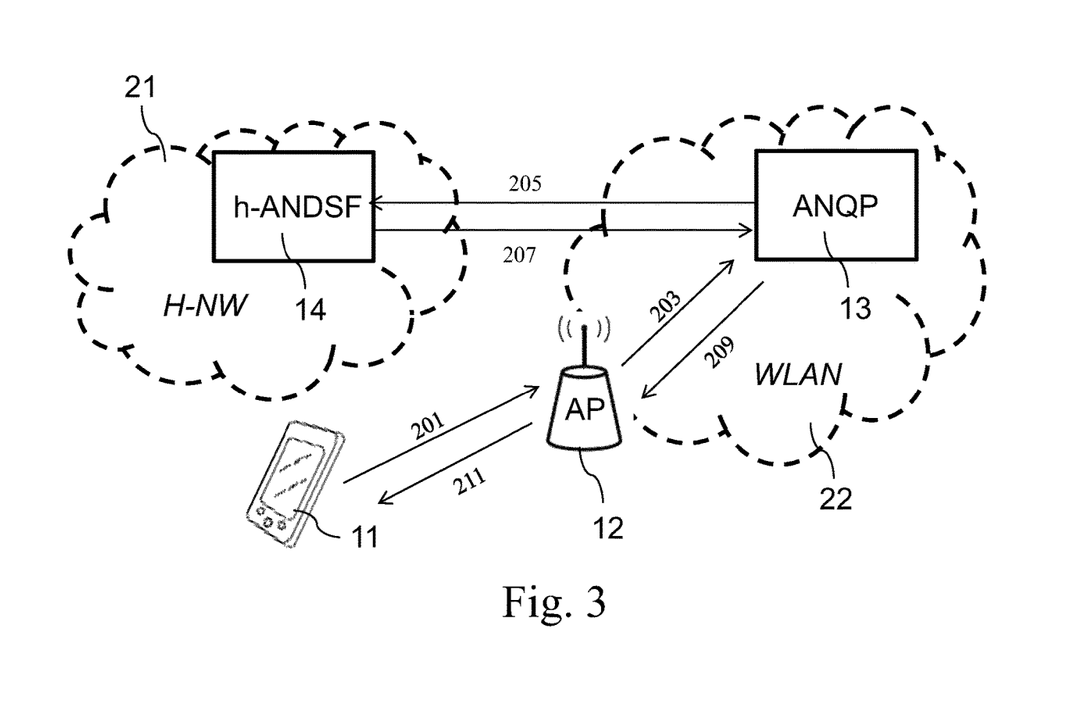
FIG. 3 illustrates a second embodiment of a network architecture in accordance with the present invention.

We refer now to FIG. 3 which illustrates a second embodiment of a network architecture in accordance with the present invention.

This second embodiment differs from the first one in that the access network server 13 of the WLAN network 22 has interactions (typically via a logical interface) with an access network discovery and selection function entity 14 located in the home mobile network 21 of the user equipment 11. In other words, both mobile network 21 and WLAN network 22 have a business and/or roaming relationship but no direct interworking functions as defined, e.g. in 3GPP, between the two networks.

In this second embodiment, the access network server 13 is still in charge of deciding whether or not to grant an access to the user equipment 11. However, this time, it takes into account the rules and policies defined by the operator of the home mobile network 21 of the user equipment 11 when making this decision, these rules and policies being implemented by an access network discovery and selection function entity 14 located within the mobile network 21.

Such an access network discovery and selection function entity 14 is typically an ANDSF server (for "Access Network Discovery and Selection Function") as defined in document 3GPP TS 24.302. Such an ANDSF server can be implemented as a stand-alone server dedicated to the functions of network discovery (i.e. providing mobile terminals with a list of mobile network and/or WLAN access points depending on certain criteria) and network selection policy enforcement (e.g. prioritizing the aforementioned list based on the mobile network operator's preferences). Alternatively, the ANDSF server can be implemented as a PCRF server (for "Policy and Charing Rule Function") on which the access network discovery and selection function entity is implemented with an additional a computer program module.

In this second embodiment, the access granting process to the WLAN network 22 is performed as follows:
  The user terminal 11 sends a probe request towards an access point 12 of the WLAN network (step 201), such a probe request being forwarded by this access point 12 to the access network server 13 inside the WLAN Network (step 203), similarly to the first embodiment.

Once the access network server 13 has received this probe request, it can determine the network address (e.g. the IP address) of the access network discovery and selection function entity 14 from the identity of the home mobile network 21 (for instance by querying a DNS server) and send a policy request to this access network discovery function entity 14, using this network address (step 205). Such a policy request comprises an identifier of the WLAN network 22, and may as well comprise the identification parameter of the home mobile network 21 received from the user equipment 11.

Once the access network discovery and selection function entity 14 has received this policy request, it can verify the identifier of the WLAN network 22 and, depending of this identifier, select a network selection rule (step 206, not illustrated) to be transmitted to the access network server 13. This rule can describe information such as the accessibility and the access point selection priority for a user equipment wishing to connect to a WLAN network, as well as charging related information.

The access network discovery and selection function entity 14 returns then a policy response message to the access network server 13 (step 207), this message comprising the network selection rule determined by the access network discovery and selection function entity 14.

Once the access network server 13 has received this policy response message, it can use the network selection rule when determining whether or not to grant access to the user equipment 11 (step 208, not illustrated). In particular, if the access network server 13 decides to grant access to a plurality of its access points which may belong to the same or different WiFi networks/providers, these access points can be listed in a priority order as defined by such a network selection rule.

If the access network server 13 decides to grant access to the user equipment 11, it sends a response message back to the access point 12 (step 209), which then forwards it to the user equipment 11 (step 211), possibly after having adapted it to a signal format compatible with the transmission of such a response message towards the user equipment, such a response message comprising the aforementioned access identifier(s) identifying one or more access point(s) of the WLAN network to which the user equipment 11 is allowed to connect.

Once it has obtained such an access identifier, the user equipment 11 can then establish a connection with an access point of the WLAN network 22 (for instance with the same access point 12 through which it managed to get the access identifier(s), or with another access point belonging to the same WiFi networks as represented by the WiFi network identifiers included in the response message if it moved within the WLAN network coverage in the meantime), in order to access internet or other types of network local services provided by the WLAN network 22.

This second embodiment is therefore particularly applicable to cases where the user equipment 11 is within the coverage of a WLAN network which has some business or roaming relationship with the home mobile network of user equipment 11 (in other words where an access network server of the WLAN network has interactions with the access network discovery and selection function entity of the home mobile network when it exists), independently of whether the user equipment 11 is within coverage of its own home mobile network.

Figure 4:
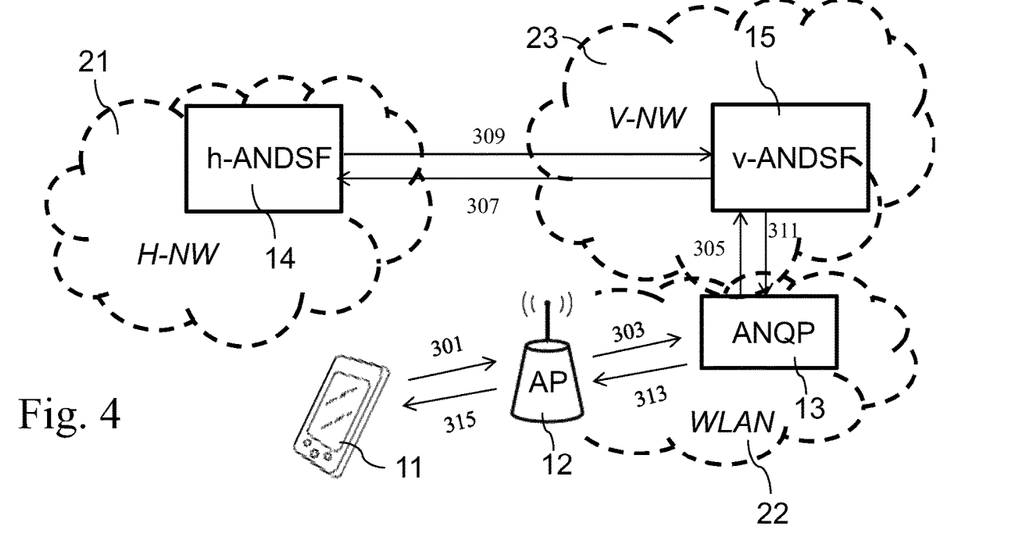
FIG. 4 illustrates a third embodiment of a network architecture in accordance with the present invention.

We refer now to FIG. 4 which illustrates a third embodiment of a network architecture in accordance with the present invention.

In this third embodiment, the WLAN network to which the user equipment 11 is trying to connect has an interworking relationship with another mobile network 23, also called "visited mobile network" and designated by V-NW in FIG. 4, which itself interworks with the home mobile network 21 of the user equipment 11, in a manner as described in standard document 3GPP TS 23.402. Just like the home mobile network 21, the visited mobile network 22 is typically a 3GPP mobile network, i.e. a mobile network working according to 3GPP standards.

In this network architecture, beyond the first access network discovery and selection function entity 14 located in the home mobile network 21, a second access network discovery and selection function entity 15 is located in the visited mobile network 23, the access network server 13 of the WLAN network being connected to this second access network discovery and selection function entity 15 rather than to the first access network discovery function entity 14 as described in the previous embodiment.

In this third embodiment, the access granting process to WLAN network 21 is performed out as follows:

The user terminal 11 sends its probe request towards an access point 12 of the WLAN network (step 301), such a probe request being forwarded by this access point 12 to the access network server 13 inside the WLAN network 22 (step 303), similarly to the first two embodiments.

Once the access network server 13 has received this probe request, it can determine the identity of the home network 21 of the user equipment 11, as explained beforehand, and retrieve from this information the network address (e.g. the IP address) of the access network discovery and selection function entity 14 within this network 21. The access network server 13 prepares then a policy request to be sent to this access network discovery and selection function entity 14 using this network address (step 304, not illustrated).

Such a policy request is then sent to the second access network discovery and selection function entity 15 of the visited network 23 (step 305), which forwards this policy request to the access network discovery and selection function entity 14 located in the home mobile network 21 of the user equipment 11 (step 307). This forwarding step may be triggered only after that the access network discovery and selection function entity 15 has verified the validity of the policy request, for instance after having checked that the user equipment 11 belongs to a roaming partner's network and, optionally, if sufficient information is available to the access network server and selection function entity for making the decisions to allow for the access to the WiFi network by the user equipment.

This access network discovery and selection function entity 14 returns a policy response message comprising a network selection rule regarding the selection of WLAN networks which can be used by the user equipment registered in mobile network 21, such as a prioritized list of WLAN access points which can be used by user equipment 11. This policy response message is returned to the access network discovery and selection function entity 15 within the visited mobile network 23 (step 309), which forwards it to the access network server 13 in the WLAN network (step 311).

Based on the network selection rule received from the access network discovery and selection function entity 14, the access network server 13 determines whether or not to grant an access to user equipment 11 (step 312, not illustrated). When that is the case, it sends a probe response message to the user equipment 11, comprising access identifier(s) of the WiFi networks that the access point(s) belongs to and which this user equipment 11 can connect to, via the access point 12 (steps 313 and 315). The user equipment 11 can then establish a connection with an access point of the WLAN network 22, using such an access identifier.

This third embodiment is therefore particularly applicable to cases where the user equipment 11 is within the coverage of a WLAN network which has some business or roaming relationship, as exemplified by the interactions between the access network server 13 and the access network discovery and selection function entity 14 within a mobile network having an interworking/roaming relationship with the home mobile network of user equipment 11, independently of whether the user equipment 11 is within coverage of its own home mobile network.

Figure 5:
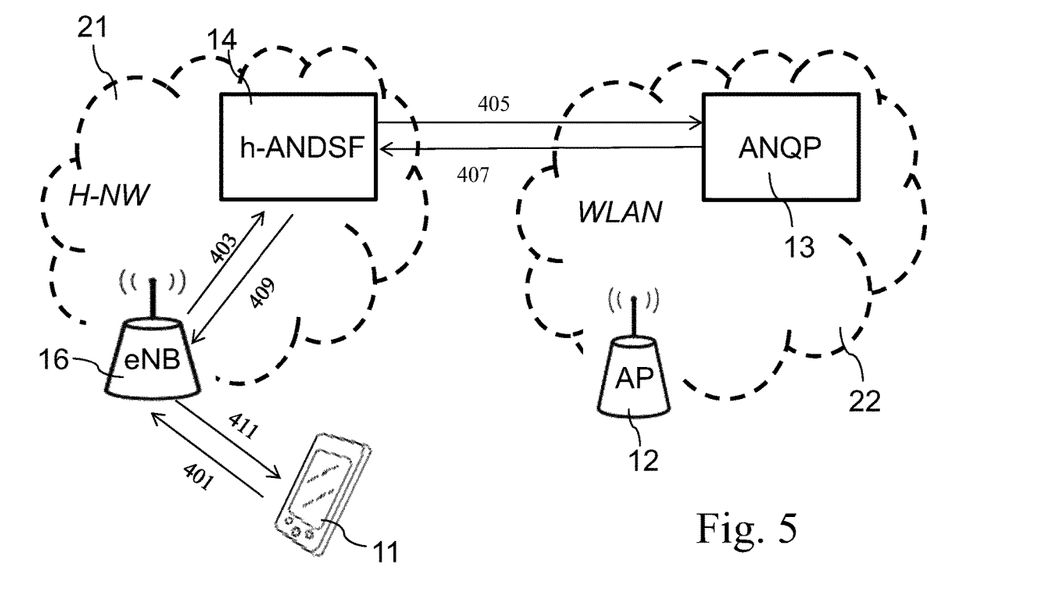
FIG. 5 illustrates a fourth embodiment of a network architecture in accordance with the present invention.

We refer now to FIG. 5 which illustrates a fourth embodiment of a network architecture in accordance with the present invention.

In this fourth embodiment, the user equipment 11 requests the access to the WLAN network 22 via its home mobile network 21, rather than through the WLAN network 22 itself, when user equipment 11 is within a cell covered by a base station 16 belonging to this mobile network 21, and possibly not (yet) within the coverage of an access point of WLAN network 22. The decision to grant, or not, access to the WLAN network is still taken by the access network server 13 of the WLAN network, as follows:

The user equipment 11 sends first a WLAN connection request towards the access network discovery and selection function entity 14 within the home mobile network 21. This is typically achieved by the user equipment 11 sending this request on a radio channel to the base station 16 (step 401), which forwards then this request within this mobile network 21 (step 403) where it is routed to the access network discovery and selection function entity 14 via a certain number of routing nodes (not illustrated).

This WLAN connection request may comprise an identifier of the WLAN network 21, for instance inputted in user equipment 11 by its user when he knows this identifier. Alternatively, when the WLAN identifier is not available (for instance because the user equipment 11 does not know yet which WLAN networks are accessible), the WLAN connection request may just contain an indication that the user equipment 11 requests to access a WLAN network, for instance by enabling a "WLAN Access" parameter inserted in such a request to be set to "TRUE" in order to ask the access network discovery and selection function entity 14 to send a query request to the access network server of WLAN network 22.

After having received this request, the access network discovery and selection function entity 14 queries the access network server 13 of the WLAN network 22 (step 405), by sending a query request to this server 13. In order to send this query request, the network address of access network server 13 may be retrieved based on the identifier of the WLAN network 21 received in the WLAN connection. This query request comprises an identifier of the home mobile network 21 (for instance its HPLMN identifier) and may also comprise a network selection rule regarding the WLAN network selection, such as a prioritized list of WLAN access points to be used by user equipment 11.

The access network server 13 then determines whether or not to grant access to user equipment 11, as previously explained (step 406, not illustrated), possibly taking account the network selection rule that the access network discovery and selection function entity 14 may have sent, and, when it decides to grant such an access, replies with a response message comprising one or more access identifier(s) identifying one or more access point(s) of the WLAN network, for instance the SSID identifier of access point 12 (step 407).

Once it has received this response message from the access network server 13, the access network discovery and selection function entity 14 can prepare a response message for user equipment 11, such a response message being in a transmission format compatible with a message transmission within mobile home network 21 and comprising the aforementioned access identifier(s) (step 408, not illustrated). This response message is then sent back to user equipment 11, typically via base station 16 (step 409) which forwards this response on a radio channel to user equipment 11 when it is located in the cell covered by this base station 16 (step 411).

Having obtained such access identifier(s), the user equipment 11 can then establish a connection with an access point of the WLAN network 22 (for instance with access point 12 using its SSID identifier, or other WiFi network access identifiers as defined in the WFA technical specifications), once user equipment 11 moves under the coverage of this access point, in order for instance to access internet or other types of network local services provided by WLAN network 22. Once this connection is established, the previously established connection with the home mobile network 21 can be disconnected, if user equipment is still within coverage of mobile network 21, in order to free some resources such as bandwidths by offloading all or part of the traffic from 3GPP access to WiFi accesses.

The present invention relates also to a device for granting access, for a user equipment registered in a home mobile network, to a wireless local area network according to the present invention. Such a device can be used in particular to implement the access network server 13 described previously, when located in the WLAN network 22.

This device comprises a receiving unit (Rx in FIG. 7) which is able to receive the probe request as described previously, which comprises a first information allowing to identify the home mobile network 21 of the user equipment 11. This receiving unit can be connectable to an access point of the WLAN network 22, in order to receive this probe request from the user equipment 11 itself through this access point, or it can be connectable to an access network discovery and selection function entity 14 or 15 of a home mobile network 21 or a visited mobile network 23, in order to receive this probe request from such an access network discovery and selection function entity. It comprises also a control unit (CTRL in FIG. 7) (implemented for instance as a processor) configured to determine one or more access point(s) of the wireless local area network to which the user equipment 11 is allowed to connect, based on an identification of its home mobile network from the first information received by the receiving unit.

This device comprises also a transmitting unit (Tx in FIG. 7) configured to send the response message previously described, which comprises one or more identifier(s) identifying one or more access point(s) of the wireless local area network. This transmitting unit can be connectable to an access point of the WLAN network 22, in order to transmit the response message to the user equipment 11 through this access points, or it can be connectable to an access network discovery and selection function entity 14 or 15 of a home mobile network 21 or a visited mobile network 23, in order to send this response message to such an access network discovery and selection function entity.

Figure 7:
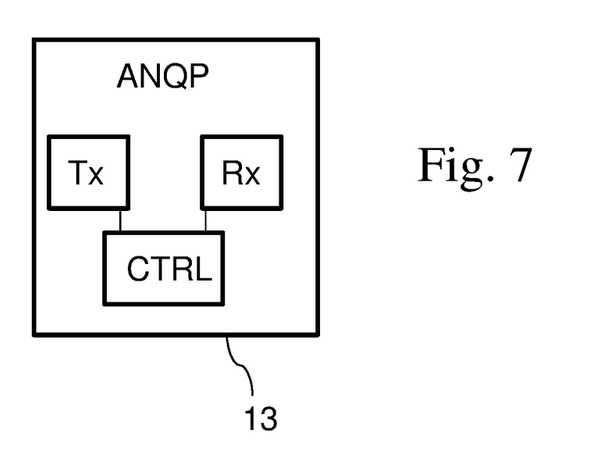
FIG. 7 is a block diagram illustrating an example of an access network server.

In order to take into account criteria defined by the operator of the home mobile network of the user equipment, this transmitting unit may be further configured to send a policy request to the access network discovery and selection function entity 14 located within the home mobile network 21 of the user equipment 11, the receiving unit may be further configured to receive, from this access network discovery and selection function entity 14, a policy response message comprising a network selection rule, and the control unit may be further configured to determine one or more access point(s) of the wireless local area network 22 in accordance with this network selection rule.

Figure 6:
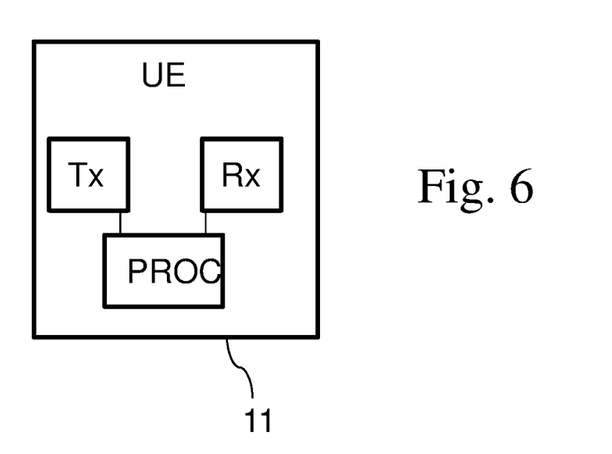
FIG. 6 is a block diagram illustrating an example of a user equipment.

FIG. 6 is a block diagram illustrating an example of user equipment 11. User equipment 11 includes a transmitter (Tx) configured to send a probe request, having first information allowing to identify the home mobile network of the user equipment, to access network server 13 of a wireless local area network; a receiver Rx configured to receive, from the access network server 13, a response message comprising at least one access identifier identifying at least one access point of the wireless local area network; and a processor PROC configured to connect the user equipment with the wireless local area network using the at least one access identifier.

FIG. 7 is a block diagram illustrating an example of access network server 13 (ANQP). Access network server 13 includes: a receiver Rx able to receive a probe request having the first information allowing to identify the home mobile network of the user equipment; a controller CTRL configured to determine at least one access point of the wireless local area network to which said user equipment is allowed to connect, based on the identification of the home mobile network from said first information; and a transmitter Tx configured to send the response message including the at least one identifier identifying the at least one access point of the wireless local area network.

Although the invention has been described with reference to certain specific embodiments it is to be understood that various modifications and improvements can be made without departing from the scope of the invention as defined in the appended claims.

The invention claimed is:

1. A method comprising:
 granting access, for a user equipment registered in a home mobile network, to a wireless local area network, comprising the following acts:
 receiving, at an access network server for said wireless local area network, a request comprising first information and at least one identifier identifying at least one wireless local network to which said user equipment is allowed to connect by said home mobile network, wherein said first information comprises a PLMN identifier of said home mobile network and/or an identifier of the subscriber using said user equipment;

determining if the user equipment is allowed to access the wireless local area network based on said first information; and responsive to the determination that the user equipment is allowed to access the wireless local area network and depending on said at least one identifier identifying at least one wireless local network to which said user equipment is allowed to connect by said home mobile network, sending, from the access network server to the user equipment, a response message comprising at least one access identifier identifying a plurality of access points of the wireless local area network.

2. The method according to claim 1, wherein the request is transmitted from the user equipment through an access point of said wireless local area network and the response message is transmitted to the user equipment through said access point.

3. The method according to claim 2, further comprising:
transmitting an access network request comprising said identifier of the home mobile network of said user equipment to a first access network discovery and server function entity located in the home mobile network of the user equipment;
receiving in response, from said access network discovery and server function entity, an access network response comprising a network selection rule;
wherein said plurality of access points is determined by the access network server using said network selection rule.

4. The method according to claim 3, wherein the wireless local area network is connected to a visited mobile network interworking with the home mobile network of the user equipment, and wherein the access network request is received by a second access network discovery and server function entity located in the visited mobile network before being forwarded to the first access network discovery and server function entity.

5. The method according to claim 1, wherein the request is transmitted by an access network discovery server and function entity located in the home mobile network of the user equipment and the response message is transmitted to said access network discovery server and function entity.

6. The method according to claim 1, wherein said first information comprises an identifier of the user equipment, the method further comprising retrieving an identifier of the home mobile network based on said identifier of the user equipment.

7. The method according to claim 1, wherein said PLMN identifier comprises a Mobile Country Code and a Mobile Network Code of said home mobile network.

8. A device for granting access, for a user equipment registered in a home mobile network, to a wireless local area network, comprising:
a receiver able to receive a request comprising first information and at least one identifier identifying at least one wireless local network to which said user equipment is allowed to connect by said home mobile network, wherein said first information comprises a PLMN identifier of said home mobile network and/or an identifier of the subscriber using said user equipment;
a controller configured to determine if the user equipment is allowed to access the wireless local area network based on said first information; and
a transmitter configured to, responsive to the determination that the user equipment is allowed to access the wireless local area network and depending on said at least one identifier identifying at least one wireless local network to which said user equipment is allowed to connect by said home mobile network, send a response message comprising at least one identifier identifying a plurality of access points of the wireless local area network.

9. The device according to claim 8, wherein:
the transmitter is further configured to send a policy request to an access network discovery and selection function entity located within the home mobile network of the user equipment;
the receiver is further configured to receive, from said access network discovery and selection function entity, a policy response message comprising a network selection rule; and
the controller is further configured to determine said plurality of access points of the wireless local area network in accordance with said network selection rule.

10. The device according to claim 8, wherein said PLMN identifier comprises a Mobile Country Code and a Mobile Network Code of said home mobile network.

11. A user equipment comprising:
a transmitter configured to send, to an access network server for a wireless local area network, a request comprising first information and at least one identifier identifying at least one wireless local network to which said user equipment is allowed to connect by said home mobile network, wherein said first information comprises a PLMN identifier of said home mobile network and/or an identifier of the subscriber using said user equipment;
a receiver configured to receive, from said access network server, a response message comprising at least one access identifier identifying a plurality of access points of the wireless local area network, sent in response to the determination that the user equipment is allowed to access said wireless local area network, based on said first information and depending on said at least one identifier identifying at least one wireless local network to which said user equipment is allowed to connect by said home mobile network; and
a processor configured to connect the user equipment with said wireless local area network using said at least one access identifier.

12. The user equipment according to claim 11, wherein said PLMN identifier comprises a Mobile Country Code and a Mobile Network Code of said home mobile network.

13. A network system comprising:
an access network server configured to grant access, for a user equipment registered in a home mobile network, to a wireless local area network, comprising:
a receiver able to receive a request comprising a first information and at least one identifier identifying at least one wireless local network to which said user equipment is allowed to connect by said home mobile network, wherein said first information comprises a PLMN identifier of said home mobile network and/or an identifier of the subscriber using said user equipment;
a controller configured to determine if the user equipment is allowed to access the wireless local area network based on said first information; and
a transmitter configured to, responsive to the determination that the user equipment is allowed to access the wireless local area network and depending on said at least one identifier identifying at least one wireless local network to which said user equipment is allowed to connect by said home mobile network, send a response message comprising at least one identifier identifying a plurality of access points of the wireless local area network; and the user equipment, which comprises:
- a transmitter configured to send, to the access network server for the wireless local area network, a request comprising said first information and said at least one identifier identifying at least one wireless local network to which said user equipment is allowed to connect by said home mobile network;
- a receiver configured to receive, from said access network server, the response message comprising the at least one access identifier identifying a plurality of access points; and
- a processor configured to connect the user equipment with said wireless local area network using said at least one access identifier.

14. The network system according to claim 13, wherein said PLMN identifier comprises a Mobile Country Code and a Mobile Network Code of said home mobile network.

15. A non-transitory recording medium comprising code instructions stored thereon for performing a method comprising the following acts performed by an access network server for a wireless local area network, when said code instructions are executed on a processor:
granting access, for a user equipment registered in a home mobile network, to the wireless local area network, wherein granting access comprises:
receiving a request comprising first information and at least one identifier identifying at least one wireless local network to which said user equipment is allowed to connect by said home mobile network, wherein said first information comprises a PLMN identifier of said home mobile network and/or an identifier of the subscriber using said user equipment;
determining if the user equipment is allowed to access the wireless local area network based on said first information; and
responsive to the determination that the user equipment is allowed to access the wireless local area network and depending on said at least one identifier identifying at least one wireless local network to which said user equipment is allowed to connect by said home mobile network, sending a response message comprising at least one access identifier identifying a plurality of access points of the wireless local area network.

16. The non-transitory recording medium according to claim 15, wherein said PLMN identifier comprises a Mobile Country Code and a Mobile Network Code of said home mobile network.

* * * * *